United States Patent [19]

Braunbach

[11] Patent Number: 4,971,123

[45] Date of Patent: Nov. 20, 1990

[54] ANGLE STOP

[75] Inventor: Karl-Heinz Braunbach, Hornbach, Fed. Rep. of Germany

[73] Assignee: Robert Bosch GmbH, Stuttgart, Fed. Rep. of Germany

[21] Appl. No.: 372,364

[22] PCT Filed: Nov. 23, 1987

[86] PCT No.: PCT/DE87/00544

§ 371 Date: Jun. 12, 1989

§ 102(e) Date: Jun. 12, 1989

[87] PCT Pub. No.: WO88/04215

PCT Pub. Date: Jun. 16, 1988

[30] Foreign Application Priority Data

Oct. 12, 1986 [DE] Fed. Rep. of Germany ....... 3642152

[51] Int. Cl.$^5$ .......................... B27C 1/12; B27B 31/00
[52] U.S. Cl. .................... 144/253 G; 33/42; 83/444; 83/745; 144/253 R; 144/114 R; 144/129
[58] Field of Search ...................... 83/444, 745; 33/42, 33/185 R; 144/129, 130, 253 R, 253 B, 253 G, 253 H; 269/303

[56] References Cited

U.S. PATENT DOCUMENTS

| | | | |
|---|---|---|---|
| 1,032,278 | 7/1912 | England | 144/253 G |
| 1,967,791 | 7/1934 | Tantz | 144/253 G |
| 2,037,286 | 4/1936 | Tautz | 144/253 G |
| 2,140,322 | 12/1938 | Lonskey | 144/253 G |
| 2,579,224 | 12/1951 | Boice | 144/253 G |
| 2,619,998 | 12/1952 | Okamuro | 144/253 G |
| 2,857,943 | 10/1958 | McEwan et al. | 144/253 R |
| 4,607,434 | 8/1986 | Francis | 83/745 |

FOREIGN PATENT DOCUMENTS 128564 7/1901 Fed. Rep. of Germany.
807718 7/1951 Fed. Rep. of Germany.
10680 of 1913 United Kingdom.

Primary Examiner—W. Donald Bray
Attorney, Agent, or Firm—Michael J. Striker

[57] ABSTRACT

The angle stop has a supporting table pivotally but securably mounted on a stationary table carrier. Means for maintaining the edge of the supporting table facing the working plane of the machine tool at a constant distance relative to the working plane in every angular position of the supporting table are provided. This means includes two opposing side parts rigidly attached to opposite sides of the supporting table each having two opposing through-going openings or slots(guideways) and guide elements connected with the table carrier extending through the through-going openings for securing the supporting table releasably in a particular angular position and for guiding its pivotal motion. This improves the secure contact of workpieces and reduces the risk of accident due to workpieces being drawn into the gap between the contact table and working plane of the machine tool.

12 Claims, 3 Drawing Sheets

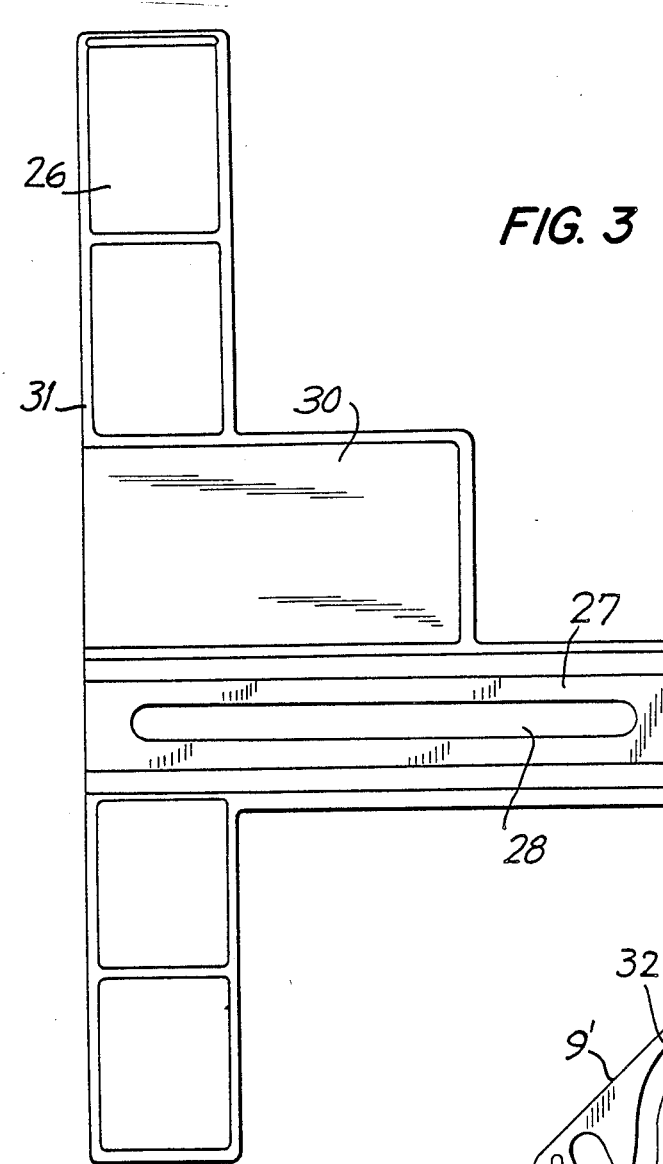

ANGLE STOP

BACKGROUND OF THE INVENTION

The invention is based on an angle stop for a machine tool and, more particularly, to an angle stop for a machine tool having a supporting table and a table carrier which can be securely connected with the housing of the machine tool, the inclination of the supporting table being adjustable with respect to the working plane of the machine tool. Adjustable angle stops are already known primarily for machine tools for wood working. In a known angle stop with two straight-edge lateral guide slots, the latter are penetrated by stationary pins. When adjusting the angle, the contact table moves on a curved path, and, although a minimum gap is maintained at the 0° position, a relatively large gap occurs between the grinding belt and the table edge on the belt side in the extreme position (45°). On the one hand, the guidance function—particularly with small workpieces—is impaired with such a large gap; on the other hand, there is the risk of accident if workpieces are drawn into the gap.

SUMMARY OF THE INVENTION

Accordingly, it is an object of my invention to provide an angle stop for a machine tool in which the gap between the tool and the table edge is kept constantly small along the entire adjusting area of the supporting table. It is also an object of my invention to provide an angle stop for a machine tool in which no fastening or other part of the angle stop projects out over the table plane.

In keeping with these objects and with others which will become apparent hereinafter, the angle stop which includes a supporting table and a table carrier also comprises two angled side parts connected with the supporting table which are provided with guideways, which are in a working connection with guide elements on the table carrier for directing the swiveling movement and which can be clamped against the table carrier. One of the guideways can extend substantially linearly at an acute angle relative to the contact surface of the supporting table and the other can comprise an at least approximately linear portion and a second portion which is curved so that the edge of the supporting table facing the working plane of the machine tool moves on a path extending substantially parallel to the working plane during its angular adjustment. Alternatively, the first guideway can extend into the middle portion of the side plate and begin in an arc facing another lateral edge of the side plate and the other comprises an at least approximately linear portion and a second portion which is curved so that the edge of the supporting table facing the working plane moves on a path which is parallel to the working plane.

Advantageously the guideways are constructed as through-going openings or slots in the side parts. The guide elements can comprise pins. Each side can have a pin which engages in a slot or guideway which can also serve as a clamping element which fixes the supporting table relative to the carrier table.

In contrast, the angle stops, according to the invention, with the characterizing features of the main claims have the advantage that the gap is kept constantly small along the entire adjusting area of the supporting table. Moreover, they have the advantage that no fastening or other part of the angle stop projects out over the table plane of the supporting table or the working plane of the machine tool. The construction also enables an expansion of the adjusting area beyond 45°.

Advantageous developments and improvements of the angle stop indicated in the main claim are made possible by means of the measures indicated in the subclaims.

BRIEF DESCRIPTION OF THE DRAWING

Two embodiment examples of the angle stop are shown in the drawing and explained in more detail in the following description.

FIG. 3 is the lower side of the table carrier; and

FIG. 4 is a side view of a supporting table according to a second embodiment example.

DESCRIPTION OF THE EMBODIMENT EXAMPLES

Figure 1:
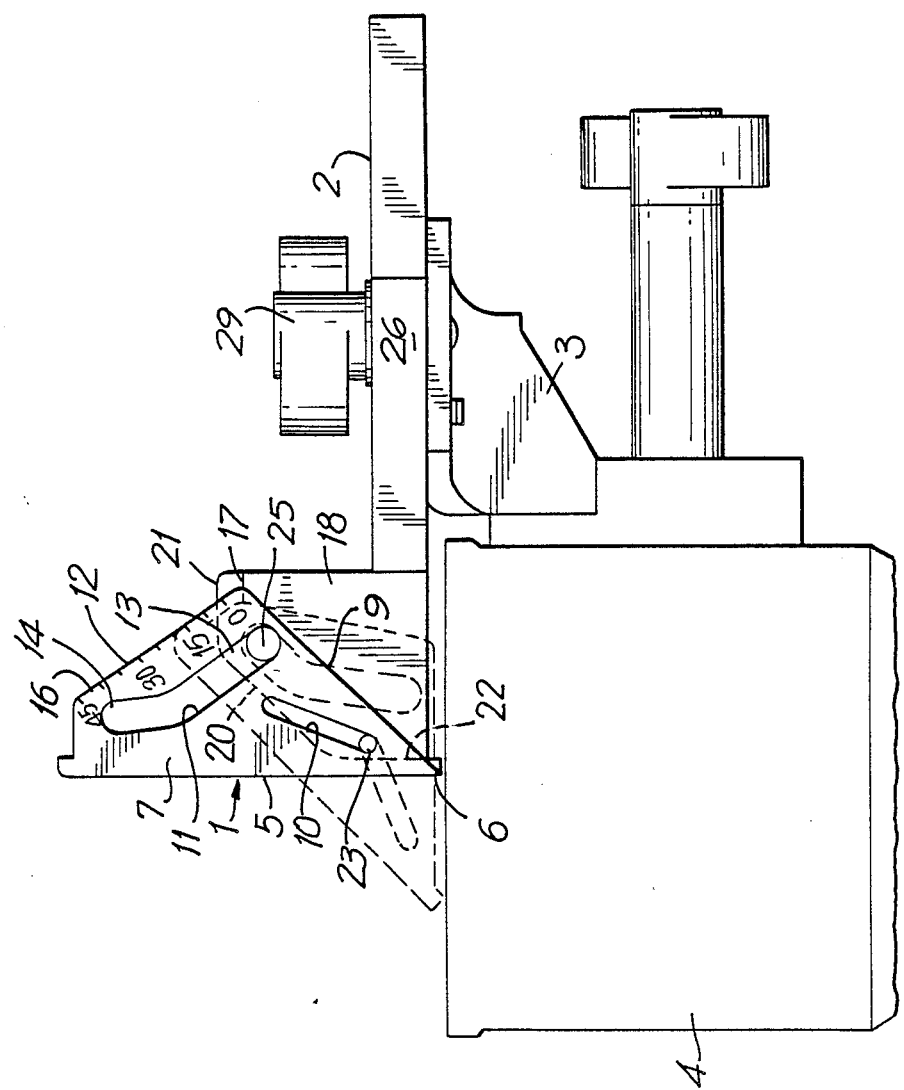
FIG. 1 is a side view of the angle stop 2 mounted on a planing tool.

The angle stop includes a swivelable supporting table 1 and a table carrier 2 which is mounted in the machine tool, e.g. a planing tool 4, either directly or by means of suitable holders 3. The supporting table 1 has a plane contact surface 5 which is bounded on the machine tool side by an edge 6. Two side parts 7, 8, which are attached to the contact table 1 at 90° and have approximately triangular surfaces, are pointed in the direction of the table carrier on the two narrow sides of the contact surface 5, wherein the angle between the contact surface 5 and the lateral edge 9 adjacent to the edge 6 is not greater than the maximum adjusting angle of the stop.

The side parts 7, 8 each include two guideways or guide slots 10,11, one of which (10) is preferably linear and is arranged in the area between the contact surface 5 and the lateral edge 9, e.g. at an angle of 22° relative to the contact surface 5. The other guideways or slots 11 extend approximately along the third lateral edge 12 of the side parts 7 and 8. The guide slots 11 are formed in each instance with a linear portion 13, which extends approximately parallel to the lateral edge 12, and a portion 14 which is slightly bent toward this lateral edge.

In order to adjust the contact angle relative to the working plane 15 of the machine tool, an angle scale 16 is arranged at the lateral edge 12. The adjusted number of angular degrees can be read at a marking 17 at the side part 18 of the table carrier 2. The angle scale and marking can also be arranged on the other side part 19 of the table carrier 2.

The side parts 18, 19 have a surface corresponding to a rectangle with beveled corner. The bevel 20 extends at an angle of approximately 45° relative to the adjacent lateral edges 21 and 22. A pin 23, or the like, is arranged in the vicinity of the lateral edge 22 and corresponds to the guide slot 10. A second pin 24 is located in the vicinity of the lateral edge 21. In the embodiment which is shown, the pin 24 penetrates the guide slot 11 as a screw with knurled head 36 and can be screwed into a threaded bore hole 25 in the side part 18.

Figure 2:
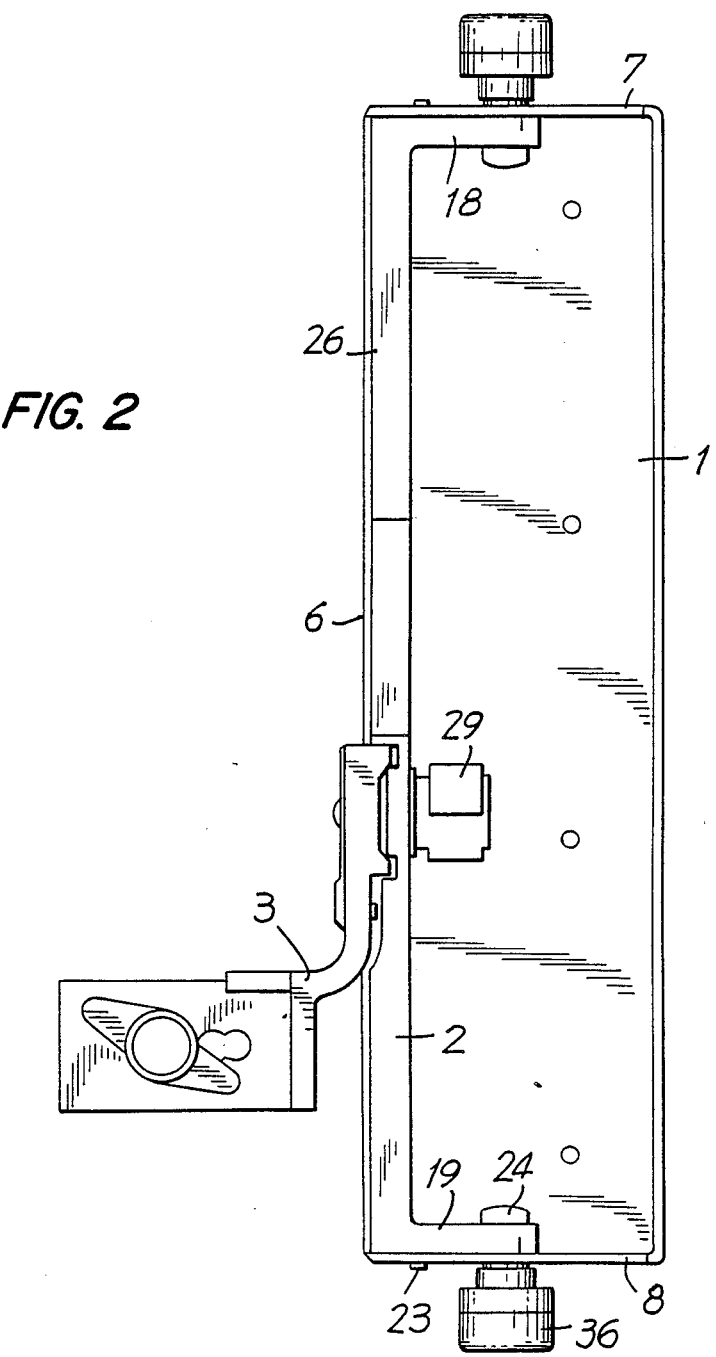
FIG. 2 is a top view of the angle stop at the 0° position of the supporting table.

The side parts 18, 19 are located at the narrow sides of a base plate 26 of the table carrier 2 (FIG. 2). In the middle area, the latter comprises a rail 27 with an elongated hole 28 (FIG. 3), which rail 27 is arranged so as to be perpendicular to the supporting table 1; a fastening screw 29 of the holder 3 can be inserted through the elongated hole 28, so that the entire angle stop is displaceable transversely relative to the holder 3 and the machine tool, respectively.

For use in planing tools, the base plate 26 has a cover plate 30 for the planing shaft. The rib 31 of the base plate 26 facing the supporting table 1 is interrupted for this purpose in the area of the cover plate 30. The supporting table 1 is also cut out in an arc-shaped manner in the area of the planing shaft, advisably at its edge 6.

In an advantageous manner, the table carrier 2 is an aluminum cast part, while the supporting table is a plate bending part. Of course, other manufacturing processes can also be applied and/or other work materials used.

According to a second embodiment shown in FIG. 4, the first guideway 32 is curved and the second guideway 33 is substantially linear. It extends approximately along the lateral edge 12'. The guideway 32 begins in the vicinity of the edge 6' and extends in an arc-shaped manner toward the lateral edge 9' so as to bulge out in the direction of the middle area of the side part 34. In order to lengthen the adjusting area beyond 45°, a short, substantially straight portion 35, which is bent slightly toward the lateral edge 12', adjoins the first arc.

The edge 6' of the supporting table 1 is beveled in such a way that it does not project over the lateral edge 9', which enables the supporting table 1 to move even closer to the working plane of the machine tool and enables a better contact of the workpiece, particularly at the 45° position of the angle stop.

The construction of the guideways is not limited to the embodiment examples in the drawing. Thus, the desired sequence of movements of the supporting table can be produced with two curved guideways. The course of the curve of the second path is obtained in that, with a given first guide guideway, a starting point for the second guideway is determined by means of selecting the position of the second stationary pin and then, when the first pin engages in the first path, the supporting table is swiveled in such a way that the edge of the supporting table facing the working plane of the machine tool moves along the working plane at a constant distance relative to the latter until the second extreme position of the supporting table.

For example, the two curved guideways can be constructed in the same way as the guide planes 11 and 32, although with a milder curvature in each instance, in order to achieve the effect described above.

The guide paths can also be constructed on recessed or raised portions, instead of as slots, with correspondingly formed engaging elements which are stationary at the table carrier. The present object may also be met by means of pins and guide paths in the side parts of the table carrier 2, which pins and guideways are stationary at the contact table.

The functioning of the angle stop can be seen clearly from FIG. 1. The zero position of the supporting table 1 is shown with solid lines, in which workpiece surfaces can be worked at a right angle to a surface contacting the supporting table 1. The other extreme position at the 45° position of the supporting table is shown in dashes. Any desired inclination of the contact table between the extreme positions is adjustable using the angle scale 16.

By "guide elements" in the following we include the first and second pin 23 and 24 with their knurled knob and associated elements.

It will be understood that each of the elements described above, or two or more together, may also find a useful application in other types of structures differing from the types described above.

While the invention has been illustrated and described as embodied in an angle stop for a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

We claim:

1. In an angle stop for a machine tool having a working plane, comprising a supporting table having a contact surface with an edge facing said working plane and a table carrier having a plurality of guide elements, said table carrier being securely mountable in said machine tool, said supporting table being adjustable with respect to its inclination relative to said working plane of said machine tool and, for this purpose, having two angled side parts provided with guideways, said guideways being in a working connection with said guide elements of said table carrier, for directing a swiveling movement of said supporting table, said side parts being clampable against said table carrier to hold said supporting table fixed relative to said working plane, the improvement wherein one of said guideways in one of said side parts extends substantially linearly at an acute angle relative to said contact surface of said supporting table and another of said guideways in said one side part has an at least approximately linear portion and a second curved portion which is curved in such a way that, when said supporting table is pivoted and said guide elements run in said guideways, said edge of said supporting table facing said working plane of said machine tool moves on a course extending substantially parallel to said working plane during angular adjustment of said supporting table.

2. In an angle stop for a machine tool having a working plane, comprising a supporting table having a contact surface with an edge facing said working plane and a table carrier having a plurality of guide elements, said table carrier being securely mounted in said machine tool, said supporting table being adjustable with respect to its inclination relative to said working plane of said machine tool and, for this purpose, having two angled side parts provided with guideways, said guideways being in a working connection with said guide elements of said table carrier, for directing a swiveling movement of said supporting table, said side parts being clampable against said table carrier to hold said supporting table fixed relative to said working plane, each of said side parts having an edge facing said working surface and another lateral edge facing away from said edge of said side part facing said working surface, the improvement wherein one of said guideways in one of said side parts extends approximately into a middle area of said one side part in the vicinity of said edge of said side part facing said working surface and said one guideway originates in a curved portion and another of said guideways in said one side part extends approximately linearly along said other lateral edge facing away from said edge of said side part facing said working surface.

3. In an angle stop for a machine tool having a working plane, comprising a supporting table having a contact surface with an edge facing said working plane and a table carrier having a plurality of guide elements, said table carrier being securely mounted in said machine tool, said supporting table being adjustable with respect to its inclination relative to said working plane of said machine tool and, for this purpose, having two angled side parts provided with guideways, said guideways being in a working connection with said guide elements of said table carrier, for directing a swiveling movement of said supporting table, said side parts being clampable against said table carrier to hold said supporting table fixed relative to said working plane, each of said side parts having an edge facing said working surface, the improvement wherein one of said guideways in one of said side parts extends approximately toward a middle area of said one side part in the vicinity of said edge facing said working surface and said one guideway originates in a curved portion, and another of said guideways has an at least approximately linear portion and a second portion which is curved in such a way that, when said supporting table is pivoted and said guide elements run in said guideways, said edge of said supporting table facing said working plane of said machine tool moves on a course extending substantially parallel to said working plane during angular adjustment of said supporting table.

4. An angle stop according to claim 1, in which said guideways are formed by through-going openings in said side parts, said guide elements engage in said through-going openings and are positioned in said table carrier, said guide elements comprising pins, at least one of said pins being located on each side of said contact table and serving as a clamping element which fixes said contact table relative to said table carrier.

5. An angle stop according to claim 1, in which said edge of said supporting table facing said working surface of said machine tool is beveled.

6. An angle stop according to claim 1, in which said table carrier has a base plate with a cover plate.

7. An angle stop according to claim 2, in which said guideways are formed by through-going openings in said side parts, said guide elements engage in said openings and are positioned in said table carrier, said guide elements comprising pins, at least one of said pins being located on each side of said contact table and serving as a clamping element which fixes said contact table relative to said table carrier.

8. An angle stop according to claim 2, in which said edge of said supporting table facing said working surface of said machine tool is beveled.

9. An angle stop according to claim 2, in which said table carrier has a base plate with a cover plate.

10. An angle stop according to claim 3, in which said guideways are formed by through-going openings in said side parts, said guide elements engage in said openings and are positioned in said table carrier, said guide elements comprising pins, at least one of said pins being located on each side of said contact table and serving as a clamping element which fixes said contact table relative to said table carrier.

11. An angle stop according to claim 3, in which said edge of said supporting table facing said working surface of said machine tool is beveled.

12. An angle stop according to claim 3, in which said table carrier has a base plate with a cover plate.

* * * * *